United States Patent
Gabathuler et al.

(10) Patent No.: US 8,781,144 B2
(45) Date of Patent: Jul. 15, 2014

(54) ATTACHMENT OF A HOOK TO A HEARING DEVICE

(75) Inventors: Bruno Gabathuler, Gruningen (CH); Paul Portmann, Schindellegi (CH); Erich Dittli, Reichenburg (CH)

(73) Assignee: Phonak AG, Stafa (CH)

( * ) Notice: Subject to any disclaimer, the term of this patent is extended or adjusted under 35 U.S.C. 154(b) by 0 days.

(21) Appl. No.: 13/390,728

(22) PCT Filed: Aug. 17, 2009

(86) PCT No.: PCT/EP2009/060632
§ 371 (c)(1),
(2), (4) Date: Feb. 16, 2012

(87) PCT Pub. No.: WO2009/150258
PCT Pub. Date: Dec. 17, 2009

(65) Prior Publication Data
US 2012/0148079 A1  Jun. 14, 2012

(51) Int. Cl.
*H04R 25/00* (2006.01)
(52) U.S. Cl.
CPC ............ *H04R 25/65* (2013.01); *H04R 2225/63* (2013.01); *H04R 2225/021* (2013.01)
USPC ............................. 381/330; 381/322; 381/324

(58) Field of Classification Search
CPC ...... H04R 25/65; H04R 25/658; H04R 1/105; H04R 1/1058; H04R 1/1066; H04R 5/0355; H04R 2225/63; H04R 2225/021
USPC ......... 381/322, 324, 328, 330, 338, 380, 381, 381/382; 181/128, 129, 130, 135
See application file for complete search history.

(56) References Cited

U.S. PATENT DOCUMENTS

| | | | |
|---|---|---|---|
| 5,204,917 A * | 4/1993 | Arndt et al. .................... | 381/324 |
| 6,748,094 B1 * | 6/2004 | Tziviskos et al. ............. | 381/330 |
| 7,123,733 B1 * | 10/2006 | Borowsky et al. ............ | 381/322 |
| 2004/0044389 A1 | 3/2004 | Crawford | |
| 2007/0037429 A1 | 2/2007 | Scholler et al. | |

FOREIGN PATENT DOCUMENTS

NL  1020904 C2  12/2003

OTHER PUBLICATIONS

International Search Report for PCT/EP2009/060632 dated Oct. 30, 2009.
Written Opinion for PCT/EP2009/060632 dated Oct. 30, 2009.

\* cited by examiner

*Primary Examiner* — Huyen D Le
(74) *Attorney, Agent, or Firm* — Pearne & Gordon LLP

(57) ABSTRACT

A hearing device with a connecting portion (15) for the connection of a hook or acoustic tube comprises an inside thread (21) or internal thread portion at the connecting portion intended for the attachment of a hook or acoustic tube.

10 Claims, 2 Drawing Sheets

ATTACHMENT OF A HOOK TO A HEARING DEVICE

Figure 1:
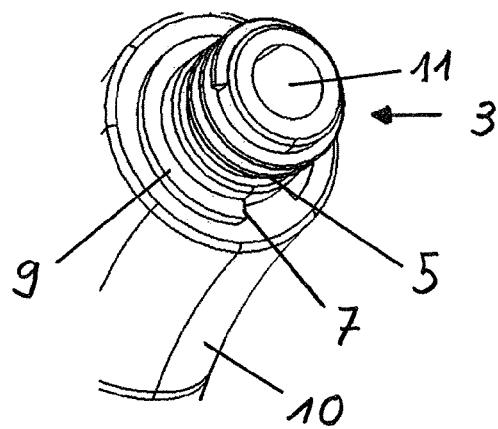

The present invention refers to a hearing device with a connecting portion for the connection of a hook or an acoustic tube according the introduction of claim 1.

Usually for an air or acoustic transmission hearing devices comprise connecting portions for the attachment of a so called hook or an acoustic or air tube. E.g. such hooks or tubes are provided for the connection to a further acoustic tube to the otoplastic for the transmission of acoustic signals to the entrance of an ear canal.

Hooks or connection tubes usually are connected to the hearing device by means of an inside thread or snap connection which is attached on a respective thread or plug nipple at the connection portion of the hearing device.

The disadvantage of such connections is that the wall surrounding the inside thread is relatively thin and in addition the protruding threads or nipples at the hearing device housing are protruding relatively widely out of the housing. In case, when attaching the hook or tube to the hearing device that to much force is applied there exists the danger that the thread portion at the hearing device is breaking away or the thread connection is over winded so that as a result the connection is not anymore airtight.

Within the EP 0 108 734 a bayonet connection between a tube and a hearing device hook is described, which means, no thread at all is used.

In a similar way within the DE 3 720 591 a so called all locking system is described for the connection of a hook to a hearing device casing.

The object of the present invention is to provide a connecting arrangement which overcomes the above mentioned disadvantages.

According the invention a hearing device is proposed with a connecting portion for the connection of a hook or an acoustic tube at which the connecting portion comprises an inside thread or internal thread portion intended for the attachment of a hook or acoustic tube.

Furthermore, the connecting portion comprises a stopper portion which is arranged such that a respective further stopper portion arranged at the respective thread of the hook or acoustic tube by abutting at the stopper portion avoids an over winding. With other words, it is proposed that a stopper portion is arranged at the connecting portion, which is radially effective.

The stopper portion at the connecting portion could be arranged e.g. at the front end of the internal thread portion and the further stopper portion at the back end of the respective thread of the hook or acoustic tube. Of course the arrangement of the stopper portion and the further stopper portion could be vice versa.

The connecting portion may further comprise a soundproof enabling connecting portion so that a soundproof connection is achievable when connecting the hook or acoustic tube to the hearing device. Vice versa a respective soundproof enabling portion could be arranged at the thread of the hook or acoustic tube. In addition at the connecting portion as well as at the thread respective soundproof enabling portions could be arranged. E.g. the end portion of the connecting portion away from the hearing device casing or the surface at the end portion could be such, that a soundproof connection is achievable or in an analogous way a respective sealing portion can be arranged at the backside end of the respective thread at the hook or acoustic tube to achieve a soundproof connection.

The end portion or surface at the end portion of the connecting portion of the hearing device as well as the sealing portion can be made out of an elastic material such as an elastomeric polymer.

A great advantage of the inventive connection is, that in case of applying draw forces the hook is destroyed at breaking away and not the hearing device.

Figure 4:
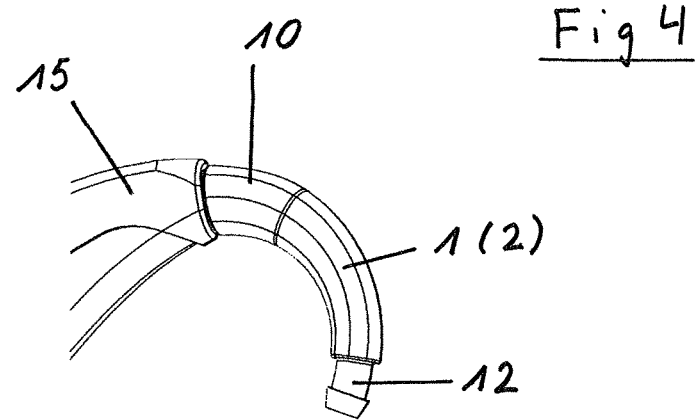
Figure 5:
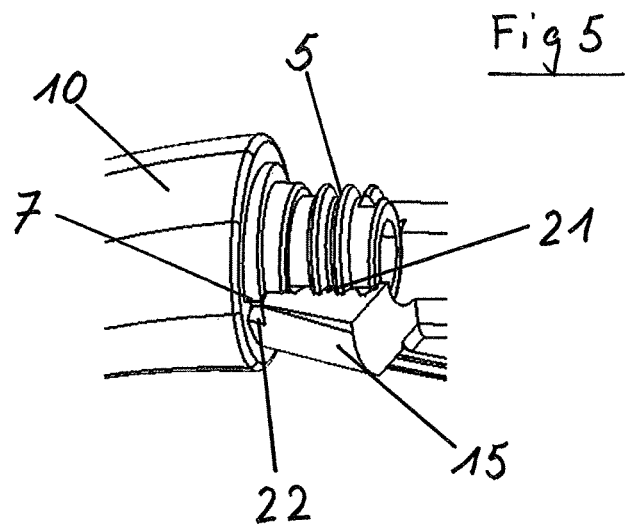

The invention shall be described in more details with reference to the attached figures. In the figures FIG. 1 shows a hook thread with an radially stopper portion, FIG. 2 shows a thin tube thread with a radial stopper portion, FIG. 3 shows the respective inside thread at the connecting portion of the hearing device again with a radially effective stopper portion, FIG. 4 shows the attached hook to the hearing device casing, and FIG. 5 shows a length cut through the connection between a connecting portion and the tread of a hook.

FIG. 1 shows in a perspective view the end portion 3 of a hook 1,10 comprising an end thread 5 provided to be thread into a respective inside thread at the connecting portion of a hearing device casing. This hook is attachable to a hearing device, e.g. as an intersection for an acoustic tube for the connection of the hearing device with a respective so called otoplastic at the entrance of an ear canal. At the base of the thread 5 a radially effective stopper 7 is arranged, the function of which shall be explained in more details later with respect to FIG. 5. Finally, at the backside portion of the thread 5, a sealing surface 9 is arranged to achieve a soundproof connection to the hearing device casing.

Figure 2:
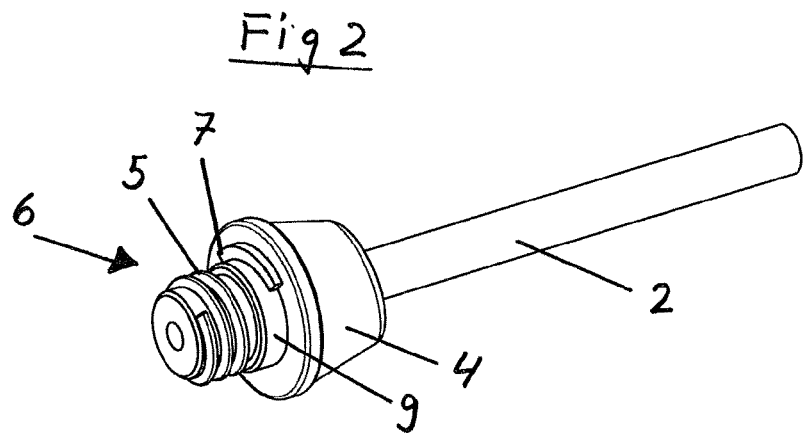

In equivalence to FIG. 1, FIG. 2 shows in a perspective view the end portion 6 of a thin tube 2 comprising an end thread 5 provided to be thread into a respective inside thread connecting portion of a hearing device casing. Due to the flexibility of the thin tube 2 it might be advisable to arrange a holding portion 4 between the thin tube 2 and the end portion 6 comprising the end thread 5.

Figure 3:
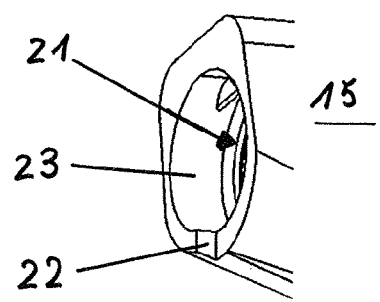

FIG. 3 shows in a perspective view the respective connecting portion 15 at a hearing device casing. For the connection to the thread as shown in FIG. 1 an inside thread or internal thread 21 is arranged, which of course corresponds with the geometry of the respective thread at the hook or thin tube. Furthermore, again a radially effective stopper portion 22 is arranged, the function of which shall be explained later on with respect to FIG. 5. Finally, again to achieve a soundproof connection to the hook or thin tube a sealing surface 23 is arranged at the end portion of the connecting portion.

The sealing surface at the thread of the hook or thin tube as well as the sealing surface 23 at the connecting portion 15 can be made out of an elastic material such as an elastomeric polymer.

FIG. 4 shows in perspective view the hook 1 or thin tube 2 being attached with its end portion 10 to the connecting portion 15 of a hearing device casing. A great advantage of the connection as shown in FIG. 4 is that no protruding parts at the hearing device as well as no nipple or thread at the hook or thin tube is visible. For the connection of an acoustic tube for the interconnection to an otoplastic the hook 1 or thin tube 2 comprises at its other end a respective further connecting portion 12.

The function of the two radially effective stopper portions, mentioned in FIGS. 1 to 3, shall be explained with respect to FIG. 5. In FIG. 5 a cut is shown lengthwise through the connection of a hook or thin tube to the hearing device casing. As it can be seen very clearly the two portions 7 and 22 will come into engagement, when the thread 5 is completely screwed into the respective inside thread 21 of the connecting portion 15 of the hearing device casing. When stopper end 7 abuts at stopper portion 22 no further screw movement is possible, so that an over winding is impossible.

The arrangement as shown with respect to FIG. 1 to FIG. 5 only shows examples for the better understanding of the present invention. It is of course possible to modify or to vary parts of this arrangement as well as it is possible to add further features. Important is that first of all, at the connecting end portion of the hearing device casing a so called inside or internal thread is arranged for the introduction of a respective thread, arranged at the end portion of a hook or thin tube. In addition, means are arranged to avoid the over winding at the screw movement, which means are provided as radially effective stopper portions.

The invention claimed is:

1. Hearing device with a connecting portion (15) for the connection of a hook or an acoustic tube (1,2) the connecting portion comprises an inside thread (21) or an internal thread portion intended for attachment of the hook or acoustic tube, wherein the connecting portion has a first facing surface and the hook or acoustic tube has a second facing surface opposing the facing surface when the hook or acoustic tube is connected to the hearing device characterized in that at the connecting portion a stopper portion (22) projecting from the first facing surface is arranged such that a respective further stopper portion (7), arranged at the second facing surface of the hook or acoustic tube by abutting at the stopper portion of the connecting portion avoids an over winding.

2. The hearing device according to claim 1, characterized in that the stopper portion (22) at the connecting portion (15) is arranged at a front opening end, such that the respective further stopper portion (7), arranged at the back end of the thread (5) of the hook or acoustic tube by abutting at the stopper portion avoids over winding.

3. The hearing device according to claim 2, characterized in that an end portion or an end surface at the connecting portion is such that a soundproof connection is achieved when connecting the hook or acoustic tube to the hearing device.

4. The hearing device according to claim 3, characterized in that the end portion or the end surface is coated or covered with or made out of an elastomeric polymer.

5. An arrangement for connecting a hearing device to an otoplastic at the entrance of an ear canal, the arrangement comprising the hearing device according to one of the claims 1 to 3 or 4, and the hook or the acoustic tube, comprising an end portion for being connected to the hearing device at the end portion.

6. An arrangement according to claim 5, characterized in that at the end portion of the hook or the acoustic tube a sealing portion is arranged to achieve a sound proof connection between the hook or the acoustic tube and the connecting portion of the hearing device.

7. A hearing device comprising:
   a hook or an acoustic tube (1,2) comprising:
      an end thread (5) at an end portion (3) wherein a first stopper portion (7) is arranged at the base of the end thread (5) such that the first stopper portion (7) extends substantially perpendicular to the base of the end thread (5);
      a sealing portion (9) arranged at a backside portion of the end thread (5) and configured to achieve a soundproof connection when connecting the hook or acoustic tube (1,2) to the hearing device;
   a connection portion (15) for the connection of the hook or acoustic tube (1, 2) comprising:
      an inside thread (21) or an internal thread portion corresponding with the end thread (5) of the hook or acoustic tube (1,2) intended for attachment of the hook or acoustic tube (1,2);
      a sealing surface (23) arranged at the end portion of the connecting portion (15) configured to achieve a soundproof connection when connecting to the hook or acoustic tube (1,2); and
      a second stopper portion (22) including a lip portion that is substantially perpendicular to an outer surface of the connecting portion (15) wherein the first stopper portion (7) and the second stopper portion (22) are configured to engage one another when the end thread (5) of the hook or acoustic tube (1,2) is coupled into the inside thread (21) of the connecting portion (15) to prevent over winding.

8. The hearing device of claim 7, further comprising a holding portion (4) positioned between the hook or acoustic tube (1,2) and the end thread (5).

9. A hearing device assembly comprising:
   a hook or an acoustic tube (1, 2) comprising:
      an end thread (5) at an end portion (3);
      a first stopper portion (7) having a first surface extending in a longitudinal direction in a radial plane of the hook or acoustic tube; and
   a connection portion (15) for the connection of the hook or acoustic tube (1, 2) comprising:
      an inside thread (21) or an internal thread portion corresponding with the end thread (5) of the hook or acoustic tube (1, 2) for attachment of the hook or acoustic tube (1, 2); and
      a second stopper portion (22) having a second surface extending in a longitudinal direction in a radial plane of the connection portion, wherein the first and second surfaces are configured to engage one another when the end thread (5) of the hook or acoustic tube (1, 2) is coupled into the inside thread (21) of the connecting portion (15) to prevent over winding.

10. A hearing device assembly comprising:
   a hook or an acoustic tube (1, 2) comprising:
      an end thread (5) at an end portion (3) wherein a first stopper portion (7) is arranged at the base of the end thread (5) such that the first stopper portion (7) extends from the base of the end thread (5);
   a connection portion (15) for the connection of the hook or acoustic tube (1, 2) comprising:
      an inside thread (21) or an internal thread portion corresponding with the end thread (5) of the hook or acoustic tube (1, 2) for attachment of the hook or acoustic tube (1,2); and
      a second stopper portion (22) including a lip portion that projects from an outer surface of the connecting portion (15) wherein the first stopper portion (7) and the second stopper portion (22) are configured to engage one another when the end thread (5) of the hook or acoustic tube (1, 2) is coupled into the inside thread (21) of the connecting portion (15) to prevent over winding.

* * * * *